No. 789,346. PATENTED MAY 9, 1905.
D. W. WILLIAMS.
CANDLE HOLDER.
APPLICATION FILED AUG. 13, 1904.

Witnesses:
Ethel M. Lowe
Daniel Westin

Inventor.
David W. Williams
Harry P. Williams
atty

No. 789,346. Patented May 9, 1905.

UNITED STATES PATENT OFFICE.

DAVID W. WILLIAMS, OF GLASTONBURY, CONNECTICUT.

CANDLE-HOLDER.

SPECIFICATION forming part of Letters Patent No. 789,346, dated May 9, 1905.

Application filed August 13, 1904. Serial No. 220,633.

*To all whom it may concern:*

Be it known that I, DAVID W. WILLIAMS, a citizen of the United States, residing at Glastonbury, in the county of Hartford and State of Connecticut, have invented a new and useful Candle-Holder, of which the following is a specification.

This invention relates to a candle-holder which is particularly adapted for camping and touring service, but which of course is also useful for ordinary domestic purposes.

The object of the invention is to provide a cheap and light candle-holder which can be easily folded, so that it may be packed into a small space, and which can be quickly opened, so that it will safely hold a candle and all drip.

The embodiment of the invention that is illustrated by the accompanying drawings has a thin metal dish-shaped base with a central hub, to which three arms are pivoted in such manner that they may be folded down into the dish or may be raised so that they will securely hold a candle and provide a handle by which it may be lifted and carried about.

Figure 1:
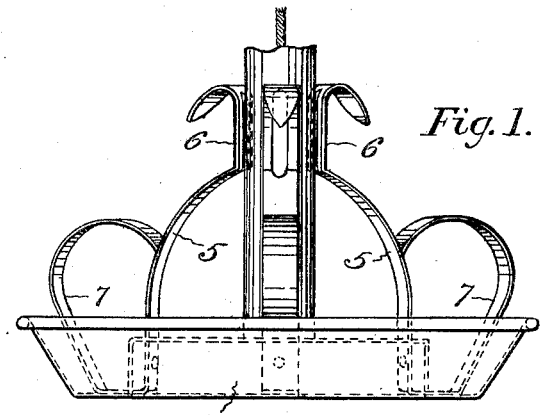
Figure 2:
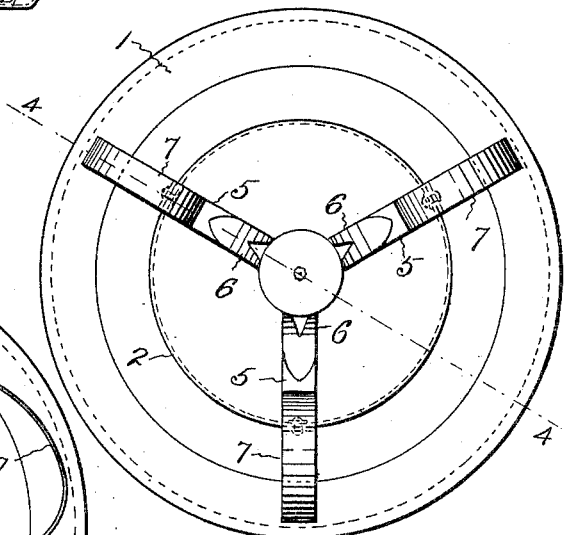
Figure 3:
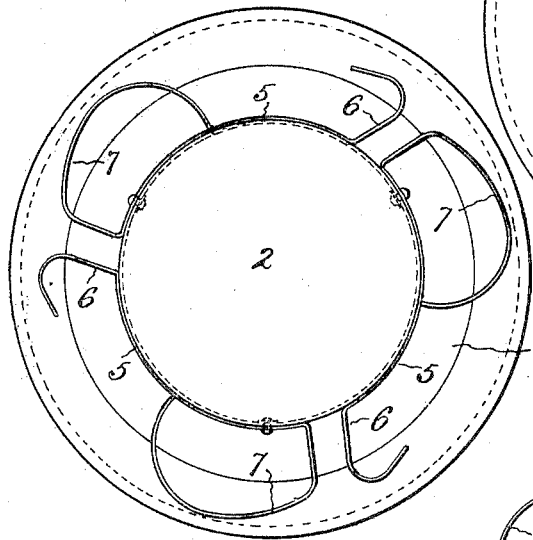
Figure 4:
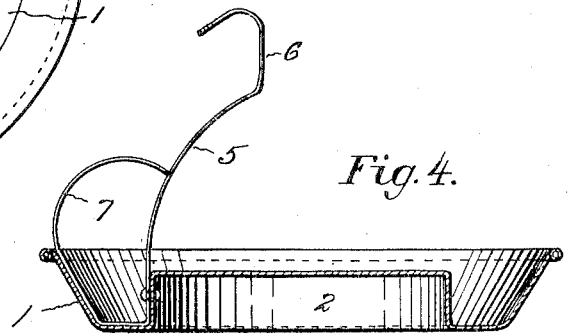

Figure 1 of the accompanying drawings shows a side elevation of this candle-holder with a candle. Fig. 2 shows a plan of the same. Fig. 3 shows a plan with the arms folded down into the dish, and Fig. 4 shows a central section of the base on the plane indicated by the line 4 4 on Fig. 2.

The base 1 of this candle-holder may be made circular, as shown, or any other desirable shape, of thin sheet metal—such as tin, brass, or aluminium, but preferably the latter. This base is dish-shaped and has a central hub 2. Pivoted to the side walls of this hub are three narrow arms of thin spring metal, such as tin, brass, or aluminium. The middle sections 5 of the arms are curved so as to conform to the contour of the hub to which they are pivoted. The upper ends 6 of the arms are bent so that when standing up a candle may be easily thrust between them and held upright. The lower ends 7 of the arms are bent upwardly and over toward the main portions, so as to form loops which may be used as handles for picking up and carrying the holder when in use, and which also assist in causing the arms to remain standing when turned up or to remain down when they are turned on their pivots into the dish. The base and these arms may be made very cheaply of ordinary metal, and they are very light. The arms may be turned upwardly, so as to hold the candle securely and provide a handle by means of which the holder may be lifted and carried about, and yet they can be quickly turned down into the dish, so that the holder may be packed into a very small space for transporting or storing.

On account of the lightness of this holder and the small space it can be made to occupy it is particularly adapted to be made a part of a touring or camping kit.

The invention claimed is—

1. A candle-holder having a dish-shaped base and candle-holding arms connected with the base by horizontal pivots whereby they may be turned vertically for supporting a candle or be turned horizontally into the base for packing, substantially as specified.

2. A candle-holder having a dish-shaped base with a central hub, and candle-holding arms connected with the side wall of the hub by horizontal pivots whereby they may be turned vertically for supporting a candle or be turned horizontally into the base between the hub and the side wall for packing, substantially as specified.

3. A candle-holder having a base, and candle-holding arms connected with the base by horizontal pivots whereby they may be turned vertically for supporting a candle or be turned horizontally into the base for packing, the upper ends of the arms being bent to receive a candle and the lower ends of the arms being bent to provide a handle when the arms are standing vertically, substantially as specified.

4. A candle-holder having a dish-shaped base with a central hub, and thin metallic candle-holding arms connected with the side wall of the hub by horizontal pivots whereby they may be turned vertically for supporting a candle or be turned horizontally into the base for packing, the upper ends of the arms being curved outwardly so as to permit a candle to be easily thrust between them, substantially as specified.

DAVID W. WILLIAMS.

Witnesses:
O. L. JACKSON,
PHILIP K. WILLIAMS.